UNITED STATES PATENT OFFICE.

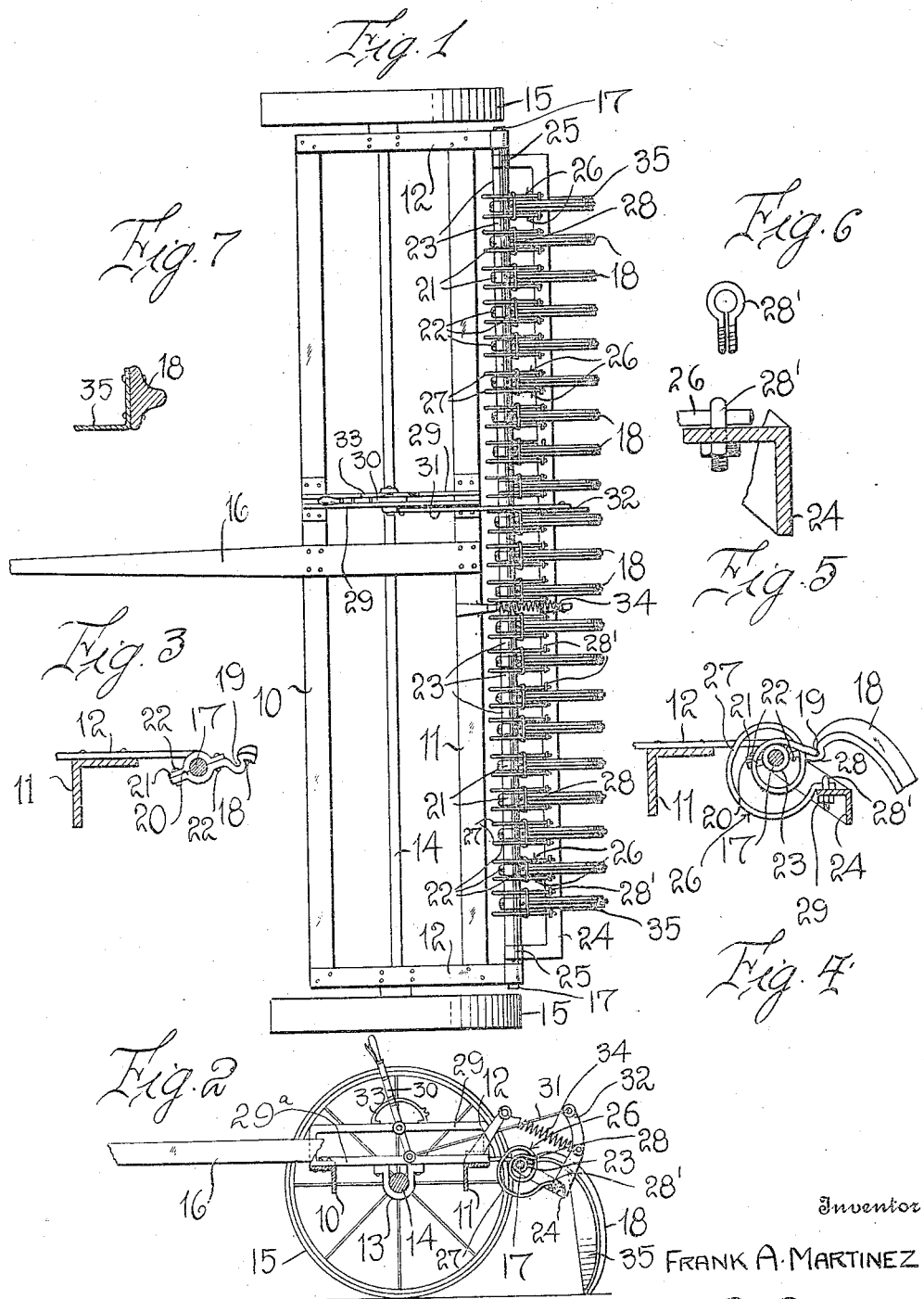
F. A. MARTINEZ.
STONE RAKE.
APPLICATION FILED NOV. 13, 1916.
1,243,327.
Patented Oct. 16, 1917.
Inventor
FRANK A. MARTINEZ
By Watson E. Coleman
Attorney

FRANK A. MARTINEZ, OF CONEJOS, COLORADO.

STONE-RAKE.

1,243,327.　　　　　Specification of Letters Patent.　　Patented Oct. 16, 1917.

Application filed November 13, 1916.　Serial No. 131,095.

*To all whom it may concern:*

Be it known that I, FRANK A. MARTINEZ, a citizen of the United States, residing at Conejos, in the county of Conejos and State of Colorado, have invented certain new and useful Improvements in Stone-Rakes, of which the following is a specification, reference being had to the accompanying drawings.

This invention relates to raking appliances and particularly to rakes designed for raking up loose stones on a field.

At the present time after a field is plowed, the loose stones turned up by the plow are either left in the field or gathered by hand, placed upon a stone boat and carried away to the stone pile.

The general object of my invention is to provide a raking device which may be used for gathering the stones from a plowed or unplowed field, where the stones are not so deeply inserted in the ground as to be practically immovable by the rake, and in this connection to provide a machine which has the strength necessary for the purpose intended but which is at the same time simple in form and easy of operation.

A still further object is to provide a construction of this character in which the teeth are yieldingly held down to their work but in which each individual tooth has independent freedom of movement upward when the tooth strikes a stone that does not yield.

A further object is to provide in connection with the teeth, a member which urges all of the teeth downward and is common to all of the teeth and provide a spring connection between said member and each individual tooth so that each individual tooth may yield when necessary.

A further object is to provide means whereby the teeth as a whole may be raised or lowered so as to dump the stones or put the rake in condition for operation.

Other objects will appear in the course of the following description.

My invention is illustrated in the accompanying drawings, wherein—

Figure 1 is a top plan view of a stone rake constructed in accordance with my invention;

Fig. 2 is a longitudinal section thereof;

Fig. 3 is a section across the beam 11 and the rod 17 showing the manner of forming the upper end of the rake teeth;

Fig. 4 is a like view to Fig. 3 but showing the spring in position and a section of the lifting bar 24;

Fig. 5 is a fragmentary section of the bar 24 showing the manner of connecting the spring thereto;

Fig. 6 is a view of one of the spring bolts; and

Fig. 7 is a cross sectional view of one of the rake teeth and a shield.

Referring to these drawings it will be seen that the frame of the machine comprises two angle bars designated 10 and 11 respectively, which extend the length of the machine and transversely to the line of draft. These angle bars may be braced from each other in any suitable manner and I have shown them as connected at their ends by means of rearwardly extending bars 12 which are preferably riveted to the flanges of the bars 10 and 11. Attached to the under faces of these end bars 12 are the semicircular metallic strips 13 or clamps which form bearings for the axle 14 carrying the wheels 15 upon which the frame is mounted. A tongue 16 is attached to the frame in any suitable manner and suitably braced from the frame.

The end bars 12 are extended rearward of the bar 11 and the ends of these bars support the transversely extending rake bar 17 which is cylindrical in cross section and extends the entire length of the machine. Mounted upon this rake bar 17 are a plurality of teeth 18. These teeth are downwardly and rearwardly curved and at its upper end each tooth is angularly bent, formed with a notch 19 (see Fig. 3), and a half clamp 20. Coacting with the half clamp 20 is a half clamp 21, these two clamps being adapted to embrace the rod or bar 17 and be held thereto by the bolts 22. Each tooth is rotatably mounted upon the transverse bar 17 so that it may rise and fall independently of any other tooth. Spacing sleeves 23 are disposed between the clamped ends of the teeth. These teeth 18 are preferably formed in cross section, as illustrated in Fig. 7 so as to provide a transversely extending forward web about three inches in width, and a rib extending longitudinally of the tooth about three inches in depth. This form of tooth is used because of its strength and it is braced by the integral rib in order to prevent its being readily broken by engagement with stones.

The teeth are normally held depressed and in an operative position by means of a transverse rod 24 which extends beneath all of the teeth and which at its ends is angularly bent and formed with eyes 25 to embrace the rod or bar 17 so that this rod 24 is pivotally connected to the bar 17. Each tooth 18 is held in yielding engagement with the rod 24 by a resilient supporting member 26. This supporting member is formed by two separate springs 27, one end of these springs being connected by an integral cross bar 28, while the opposite ends of the springs are attached to the cross bar 24. This cross bar 24 is angular in cross section and the ends of the pair of springs 27 are attached to this cross bar or rod 24 by means of eye bolts 28', one of which is shown in Fig. 6. Each of these eye bolts is split from the end of its shank to the eye so that it may be readily placed upon the spring and then the shank of the eye bolt is closed, the bolt inserted through the proper perforation in the cross bar 24, and then a nut is applied. These eye bolts clamp the ends of the pairs of springs securely to the cross bar 24. The cross bar 28 of each pair of springs is received in the notch 19 formed in the upper end of each tooth 18. It will thus be seen that each tooth is yieldably connected to the cross bar 24 and that the weight of this cross bar urges all of the teeth downward. If, however, any individual tooth strikes a stone that is too deeply embedded in the ground to be detached, then the tooth will yield upward to an extent depending upon the elasticity of the spring and the tooth will not be broken.

In order to provide for the lifting of all the teeth when it is desired to put the teeth out of operative engagement with the ground, I connect the bars 10 and 11 by means of a pair of upper cross bars 29 and a cross bar 29ª and pivot between these bars 29 the lever 30, the lower end of which is connected by a link 31 to a crank arm 32 which is attached to and projects upward from the cross bar 24. The lever 30 may operate over a sector 33 and when the lever is moved rearward it is obvious that the cross bar 24 will be lifted and with it all of the teeth 18, and that when the lever is moved forward the teeth will be lowered and the weight of the cross bar 24 will tend to urge the teeth down to their work. A spring 34 is attached to the frame bar 11 and to a crank arm 32 and resists to some extent the downward movement of the bar 24 and of the teeth, thus preventing the teeth from dropping too quickly upon the ground, and cushioning the downward movement of the teeth.

The end teeth are preferably provided with sheet iron shields 35, segmental in form and riveted to the teeth, these shields extending forward of the teeth, and these shields hold the stones from slipping around the ends of the rake.

This machine in actual practice will be about six feet wide and the frame will be about two feet above the ground and two and one-half feet from front to rear. The teeth will be spaced about two inches from each other and are held in this spaced relation by the sleeves 23. The machine may be drawn by a tractor or by draft animals and will rake up and collect all stones which may be loose upon the surface of the ground or which may be only partially embedded therein. It will be seen that this construction is very simple but that it will be thoroughly effective for the purpose intended. Because of the spring support of the teeth, the teeth will not be liable to be broken and by reason of the fact that there is a yielding or spring connection between the teeth and the cross bar 24 and that this cross bar is connected to the elevating lever, it will be obvious that the teeth will be resiliently supported at all distances from the ground upon which they may be working.

Having described my invention, what I claim is:

1. A stone rake comprising a wheeled frame, a plurality of teeth pivotally connected to the frame, means common to all of the teeth urging them downward, resilient supporting connections between each tooth and the said urging means permitting each tooth to rise independently of any other tooth, and manually operable means for raising or lowering all of the teeth.

2. A stone rake comprising a wheeled frame, a plurality of teeth pivotally connected to the frame, means yieldingly urging the teeth downward into operative position, means for raising or lowering the teeth, and shields carried by the end teeth and preventing lateral movement of the stones gathered by the rake.

3. A stone rake comprising a wheeled frame, a transversely extending cross bar mounted upon the frame, a plurality of spaced downwardly and rearwardly curved teeth, each independently pivoted upon the cross bar, a cross bar extending below the teeth and pivotally connected to the cross bar upon which the teeth are mounted, yieldable connections between the second named cross bar and each individual tooth, means yieldingly resisting the downward movement of the cross bar, and manually operable means for raising or lowering the cross bar.

4. A stone rake comprising a wheeled frame including parallel transversely extending bars, a cross bar carried rearward of the frame, a plurality of teeth each swingingly mounted upon the cross bar, means spacing the teeth from each other, a cross bar extending beneath the teeth and swingingly connected to the first named cross bar, springs operatively connecting the second named cross bar to each individual tooth and permitting independent movement of each tooth relative to the second named cross bar, and manually operable means for raising or lowering the second named cross bar.

5. In a rake of the character described, a wheeled frame, a cross bar, a plurality of teeth swingingly connected to the cross bar and extending rearward and downward, an elevating bar extending beneath the teeth and pivotally supported, manually operable means for raising or lowering the elevating bar, and a plurality of pairs of coiled springs, one pair for each tooth, the like ends of each pair of springs being attached to the elevating bar, the springs being coiled and their inner ends connected by a cross bar, the cross bar of each pair of springs extending across and bearing upon the corresponding tooth, said tooth being formed with a seat for the cross bar.

6. A stone rake comprising a wheeled frame, a transversely extending cross bar mounted upon the frame, a plurality of spaced downwardly and rearwardly extending teeth, each independently pivoted upon the cross bar, a cross bar extending below all of the teeth and pivotally connected to the cross bar upon which the teeth are mounted, yieldable connections between the second named cross bar and each individual tooth, a lever pivoted upon the frame of the machine, a crank arm mounted upon the second named cross bar and extending upward therefrom, and an operative connection between the lever and said crank arm, whereby a movement of the lever in one direction will cause the raising of the second named cross bar and the lifting of all of the teeth.

In testimony whereof I hereunto affix my signature in the presence of two witnesses.

FRANK A. MARTINEZ.

Witnesses:
J. D. VALDEZ,
FRANK A. ESPIROZA.

Copies of this patent may be obtained for five cents each, by addressing the "Commissioner of Patents, Washington, D. C."